US011624683B2

(12) United States Patent
Dark

(10) Patent No.: US 11,624,683 B2
(45) Date of Patent: Apr. 11, 2023

(54) MULTI-AXIS OSCILLATING FLIGHT SIMULATOR

(71) Applicant: Honeywell Federal Manufacturing & Technologies, LLC, Kansas City, MO (US)

(72) Inventor: Phillip Ryan Dark, Kansas City, KS (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 260 days.

(21) Appl. No.: 17/123,290

(22) Filed: Dec. 16, 2020

(65) Prior Publication Data

US 2021/0190648 A1 Jun. 24, 2021

Related U.S. Application Data

(60) Provisional application No. 62/949,857, filed on Dec. 18, 2019.

(51) Int. Cl.
| | |
|---|---|
| *G01N 1/28* | (2006.01) |
| *H02P 29/40* | (2016.01) |
| *H02P 29/60* | (2016.01) |
| *G01C 25/00* | (2006.01) |
| *G01N 1/00* | (2006.01) |

(52) U.S. Cl.
CPC ............ *G01N 1/28* (2013.01); *G01C 25/005* (2013.01); *H02P 29/40* (2016.02); *H02P 29/60* (2016.02); *G01N 2001/002* (2013.01); *G01N 2001/2893* (2013.01)

(58) Field of Classification Search
None
See application file for complete search history.

(56) References Cited

U.S. PATENT DOCUMENTS

| | | | |
|---|---|---|---|
| 3,181,812 A * | 5/1965 | Dixson | G01C 21/165 |
| | | | 356/147 |
| 7,359,816 B2 | 4/2008 | Kumar et al. | |
| 8,108,171 B2 | 1/2012 | Judd | |
| 9,146,134 B2 | 9/2015 | Lokshin et al. | |
| 9,466,223 B2 * | 10/2016 | Stevens | G09B 9/06 |
| 9,810,549 B2 | 11/2017 | Johnson et al. | |
| 9,857,198 B2 | 1/2018 | Frey, Jr. | |
| 9,863,785 B2 | 1/2018 | Wu et al. | |
| 10,015,481 B2 | 7/2018 | Jarok | |
| 10,297,168 B1 | 5/2019 | Virgili-Llop et al. | |
| 2002/0055086 A1 * | 5/2002 | Hodgetts | G09B 9/12 |
| | | | 434/37 |
| 2014/0302462 A1 * | 10/2014 | Vatcher | G09B 9/12 |
| | | | 434/55 |

(Continued)

*Primary Examiner* — Raul J Rios Russo
*Assistant Examiner* — Carl F. R. Tchatchouang
(74) *Attorney, Agent, or Firm* — Hovey Williams LLP

(57) ABSTRACT

An apparatus for simulating an oscillating flight path is provided. The apparatus comprises a slide extending along a first axis; a support structure slidably coupled to the slide; and a table connected to the support structure. The support structure is operable to move along the slide. The table is coupled to the support structure and operable to rotate about a second axis orthogonal to the first axis. The table comprises a surface that is parallel to the second axis and that is operable to rotate about a third axis orthogonal to the second axis.

17 Claims, 7 Drawing Sheets

(56) References Cited

U.S. PATENT DOCUMENTS

2016/0091894 A1* 3/2016 Zhang ............... G09B 9/24
                                               701/2
2017/0101178 A1* 4/2017 Lee .................. B64C 39/024
2018/0094946 A1   4/2018 Vogl

* cited by examiner

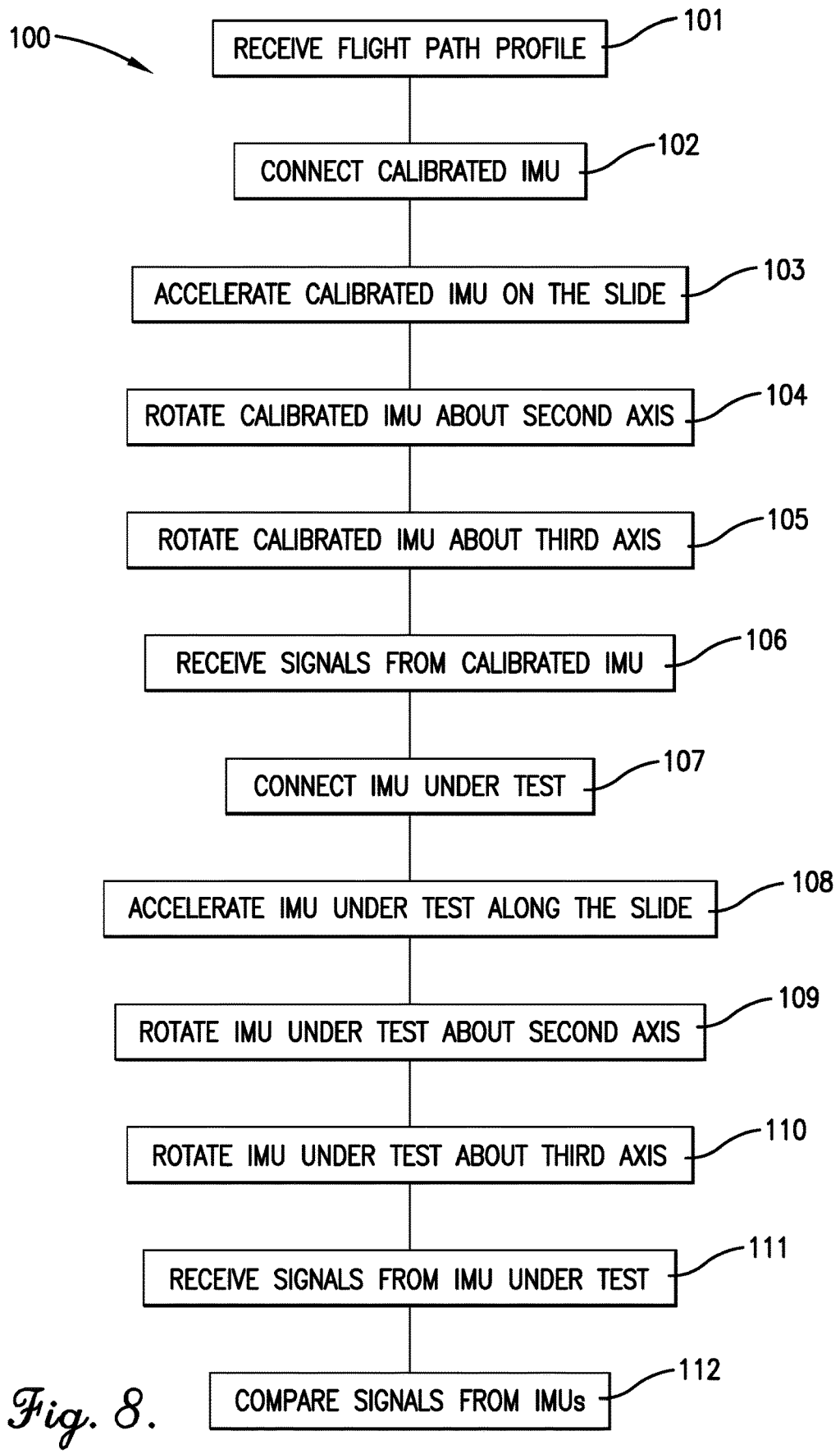

MULTI-AXIS OSCILLATING FLIGHT SIMULATOR

RELATED APPLICATIONS

This application claims the benefit of U.S. Provisional Application Ser. No. 62/949,857, filed Dec. 18, 2019, entitled MULTI-AXIS OSCILLATING FLIGHT SIMULATOR, the entire disclosure of which is hereby incorporated by reference herein.

STATEMENT REGARDING FEDERALLY-SPONSORED RESEARCH OR DEVELOPMENT

This invention was made with Government support under Contract No.: DE-NA-0002839 awarded by the United States Department of Energy/National Nuclear Security Administration. The Government has certain rights in the invention.

BACKGROUND

Inertial measurement units include various combinations of one or more accelerometers, gyroscopes, and the like. Inertial measurement units have to be tested and/or calibrated prior to use. For certain applications, the path the inertial measurement unit likely takes is often complicated and therefore difficult to simulate in a laboratory. To simulate high speeds or acceleration, inertial measurement units are often placed on spinning surfaces, but such setups often introduce errors due to centrifugal forces. Such setups also require wireless communication or complicated wiring systems to transmit signals from the inertial measurement units to external computing devices. However, in some applications, wireless communication is prohibited, so setups that require wireless communication with the inertial measurement units are not as accurate and needlessly more expensive.

The background discussion is intended to provide information related to the present invention which is not necessarily prior art.

SUMMARY

The present invention solves the above-described problems and other problems and provides an apparatus for simulating an oscillating flight path and a method of testing an inertial measurement unit that more accurately simulates real-world applications.

An apparatus constructed in accordance with an embodiment of the present invention is provided for simulating an oscillating flight path. The apparatus broadly comprises a slide extending along a first axis; a support structure movably coupled to the slide; and a table coupled to the support structure. The support structure is movably coupled to the slide so that the support structure is operable to move along the slide.

The table is connected to the support structure and is operable to rotate about a second axis orthogonal to the first axis. The table comprises a surface parallel to the second axis that is operable to rotate about a third axis orthogonal to the second axis. The ability of the multi-axis rotatable table to translate along the slide enables more accurate simulation of oscillating flight paths without requiring complicated wiring or wireless communication.

A method of testing an inertial measurement unit according to an embodiment of the present invention comprises accelerating a support structure along a slide extending along a first axis, the support structure being movably coupled to the slide; rotating a table connected to the support structure about a second axis orthogonal to the first axis; rotating a surface parallel to the second axis about a third axis orthogonal to the second axis, the inertial measurement unit being attached to the surface; and receiving a signal representative of the output of the inertial measurement unit.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 8 is a flowchart illustrating a method of testing an inertial measurement unit according to an embodiment of the present invention.

Figure 1:
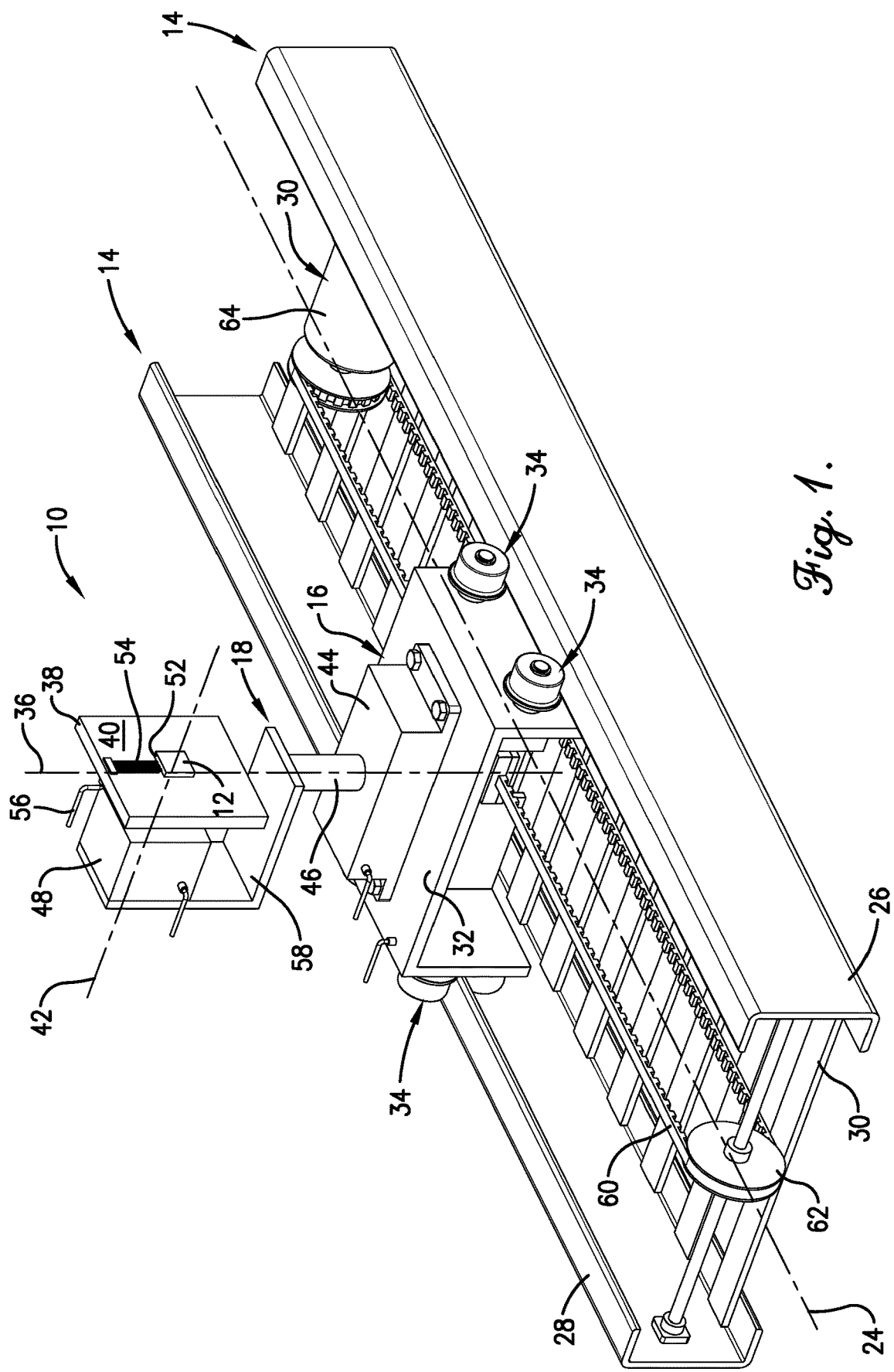
FIG. 1 is an elevated perspective view of an apparatus constructed in accordance with embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 2:
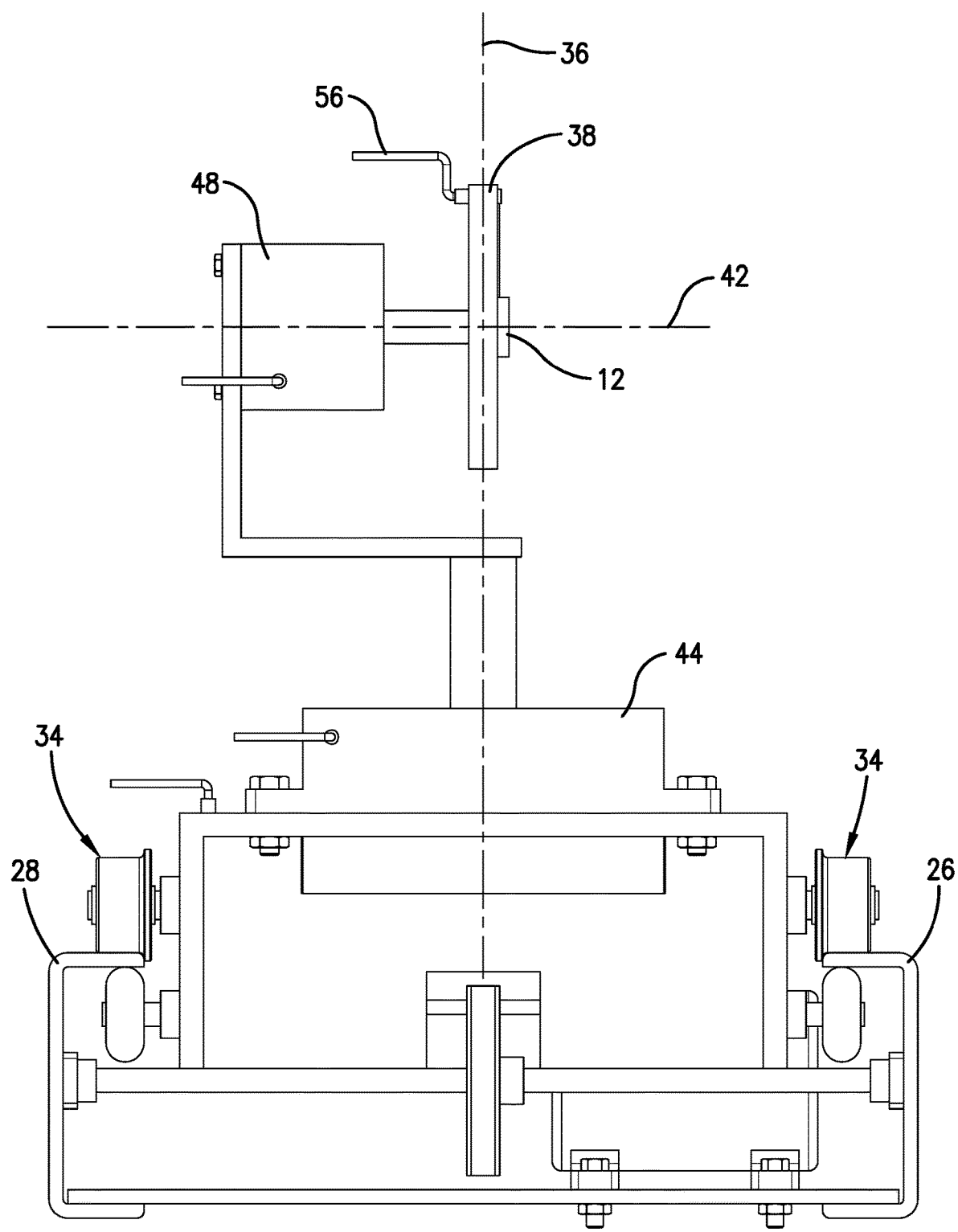
FIG. 2 is a front perspective view of the apparatus of FIG. 1.
Figure 3A:
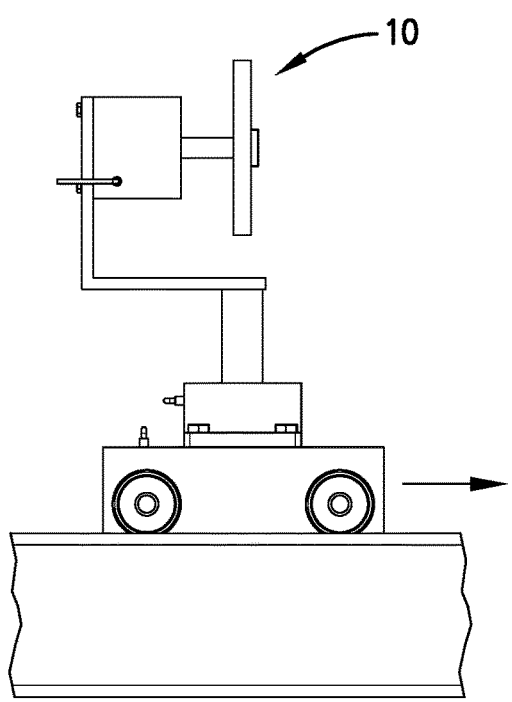
FIG. 3A is a side perspective view of the apparatus of FIG. 1 moving along a slide of the apparatus.
Figure 3B:
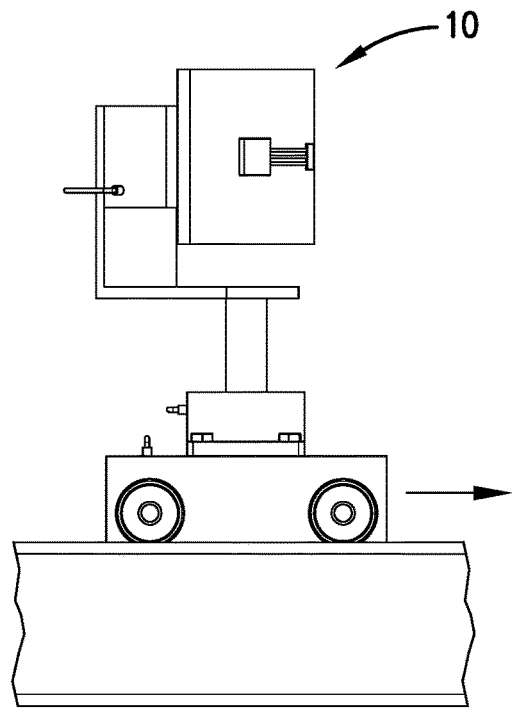
FIG. 3B is a side perspective view of a platform of the apparatus of FIG. 1 rotating about a second axis.
Figure 3C:
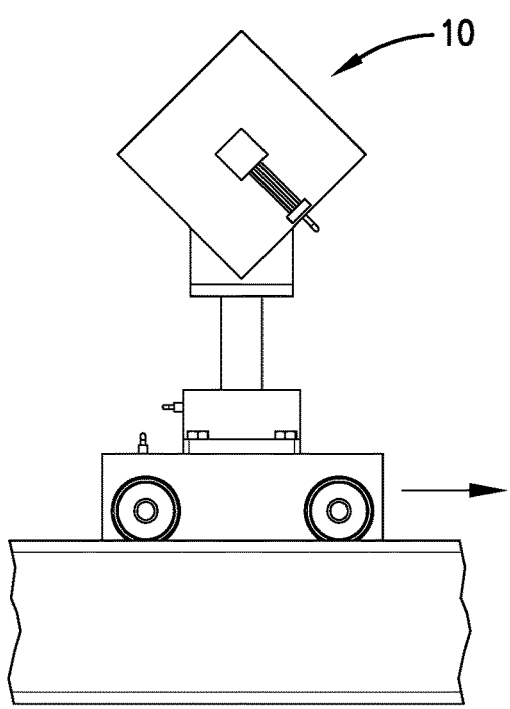
FIG. 3C is a side perspective view of the platform of the apparatus of FIG. 1 rotating about the second axis and about a third axis.
Figure 3D:
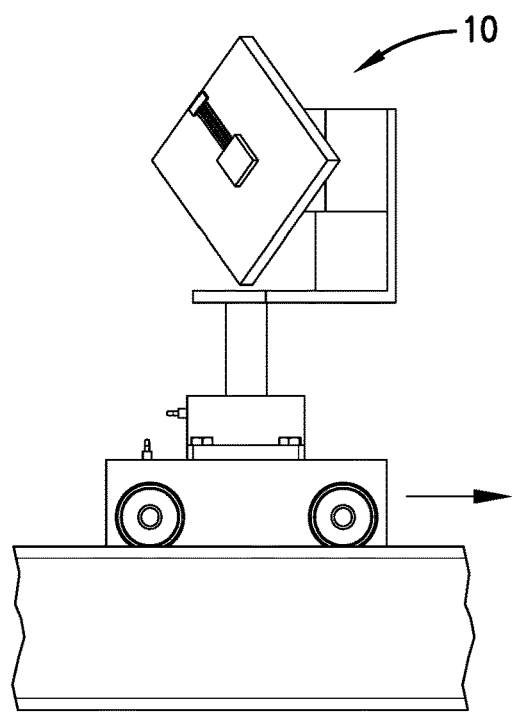
FIG. 3D is a side perspective view of the platform of the apparatus of FIG. 1 continuing to rotate about the second axis.
Figure 4:
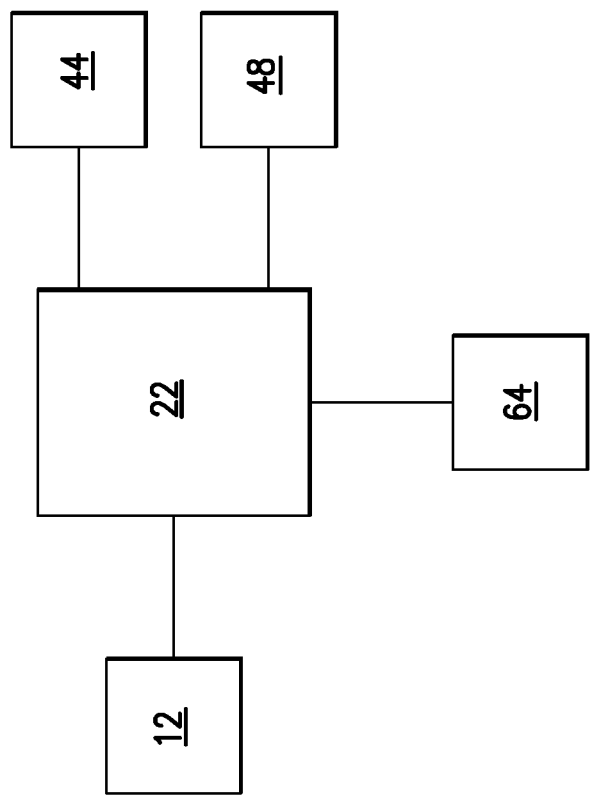
FIG. 4 is a schematic diagram of the apparatus of FIG. 1.

Turning to FIGS. 1 and 2, an apparatus 10 constructed in accordance with an embodiment of the present invention is illustrated. The apparatus 10 is provided for simulating an oscillating flight path to test an inertial measurement unit (IMU) 12. The IMU 12 may include sensors, accelerometers, gyroscopes, or the like. The apparatus 10 broadly comprises a slide 14, a support structure 16 movably coupled to the slide 14, a two-axis table 18 coupled to the support structure 16, a drive system 20 operable to actuate the support structure 16, and a control system 22 to control operation of the apparatus 10 (as depicted in FIG. 4).

The slide 14 extends along a first axis 24 for guiding the support structure 16. The slide 14 may comprise one or more tracks 26, 28 supported by cross bars 30. The first axis 24 may be horizontal relative to the ground, or alternatively the first axis 24 may be at least partially vertical relative to the ground. The slide 14 may be made of any durable material without departing from the scope of the present invention. For example, the slide 14 may comprise metal, such as steel c-channel beams.

The support structure 16 is operable to move along the slide 14 and support the table 18. The support structure 16 may comprise a chassis 32 having wheels and/or bearings 34 for movably coupling with the slide 14.

The two-axis table 18 is supported on the chassis 32 and is operable to rotate about a second axis 36 orthogonal to the first axis 24, as depicted in FIGS. 3A-3D. The table 18 comprises a platform 38 having a surface 40 parallel to the second axis 36 that is operable to rotate about a third axis 42 orthogonal to the second axis 36. The table 18 may comprise a first motor 44 attached to the chassis 32 and having a drive rod 46 extending along the second axis 36, a second motor 48 coupled to the drive rod 46 of the first motor 44. The second motor 48 may also have a drive rod 50 extending along the third axis 42 and coupled to the platform 38. The motors 44, 48 may include encoders for providing positional feedback to the control system 22. In some embodiments, the table 18 may alternatively have only one motor 44 and a gear system.

The platform 38 may comprise a harness 52 positioned on the surface 40 for coupling the IMU 12 and electrical conduits 54 for electrically connecting the IMU 12 to one or more wires 56 that are electrically connected to the control system 22. The harness 52 may be positioned at different locations, depending on the desired simulated flight path. To test the ability of the IMU 12 to detect acceleration at all angles, the IMU 12 may preferably be positioned where the second axis 36 and the third axis 42 intersect. For example, the harness 52 may preferably be located at the center of the surface 40, and the second motor 48 may be offset from the drive rod 46 of the first motor 44, such as via a bracket 58, so that the platform 38 is suspended above the drive rod 46 with the harness 52 near the intersection of the second axis 36 and the third axis 42.

This allows the apparatus 10 to used wired communication between the IMU 12 and the control system 22. The surface 40 would only need to rotate 180 degrees about the second axis 36 and only 180 degrees about the third axis 42. Because table 18 does not rotate over 360 degrees, wireless communication or complicated wiring systems are not required. This allows for simulating applications in which wireless communication is prohibited. Additionally, the less complicated wiring system of the present invention reduces error.

The drive system 20 is operable to accelerate the support structure 16 and therefore the table 18 along the slide 14. The drive system 20 may comprise a belt 60, a pulley 62 engaged with the belt 60, and a motor 64 engaged with the belt 60. The belt 60 may be connected to the chassis 32 and movable about the pulley 62. The motor 64 is operable to move the belt 60 about the pulley 62 in both directions to accelerate the support structure 16 in either directions along the slide 14. The motor 64 may have an encoder for providing positional feedback to the control system 22. The drive system 20 may include other configurations without departing from the scope of the present invention. For example, the drive system 20 may comprise a gear system, an electromagnetic propulsion system, a motor positioned on the support structure 16, or the like for propelling the support structure 16 along the slide 14.

The control system 22 may control operation of the apparatus 10 and may comprise any number or combination of controllers, sensors, circuits, integrated circuits, programmable logic devices such as programmable logic controllers (PLC) or motion programmable logic controllers (MPLC), computers, processors, microcontrollers, transmitters, receivers, amplifiers, other electrical and computing devices, and/or residential or external memory for storing data and other information accessed and/or generated by the apparatus 10.

The control system 22 is preferably in wired communication with the IMU 12 and the motors 44, 48, 64, as depicted in FIG. 4. However, the control system 22 may be in wireless communication with the IMU 12 and the motors 44, 48, 64 without departing from the scope of the present invention. The control system 22 may be configured to direct the motor 64 to accelerate the support structure 16 along the slide 14 and direct the motors 44, 48 to rotate the platform 38 around the second axis 36 and/or the third axis 42. The control system 22 may be configured to receive signals generated by the IMU 12 in response to movement or acceleration. The control system 22 may be configured to receive a profile corresponding to a particular flight path, and direct the motors 44, 48, 64 to operate and accelerate the table 18 according to the profile. The control system 22 may be configured to store signals associated with a pre-calibrated IMU that experienced that particular flight path. The control system 22 may be configured to compare the stored signals with the signals of an IMU 12 being tested.

Figure 7:
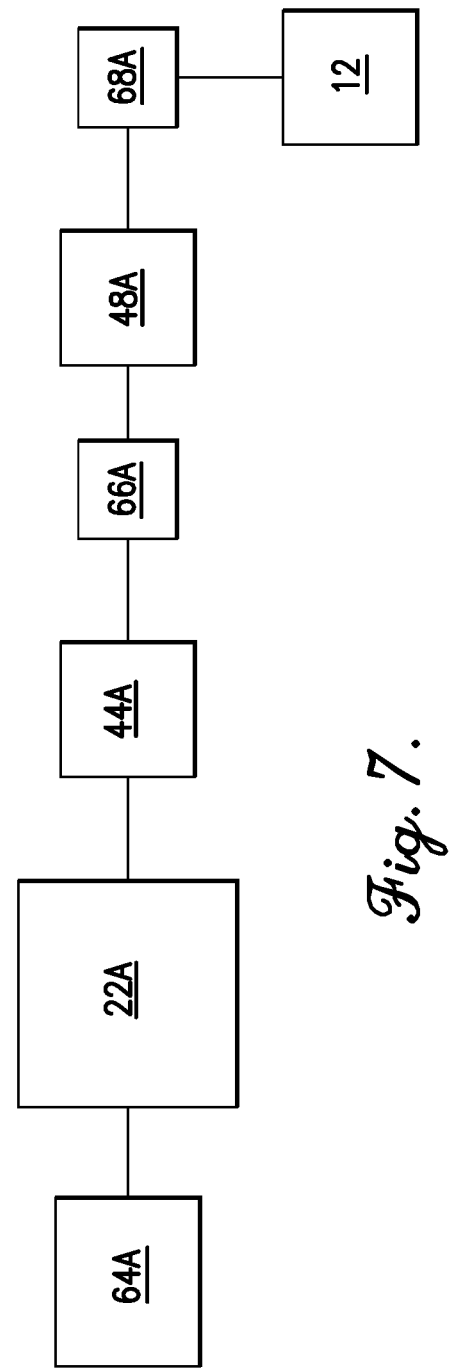
FIG. 7 is a schematic diagram of the apparatus of FIG. 5.
Figure 5:
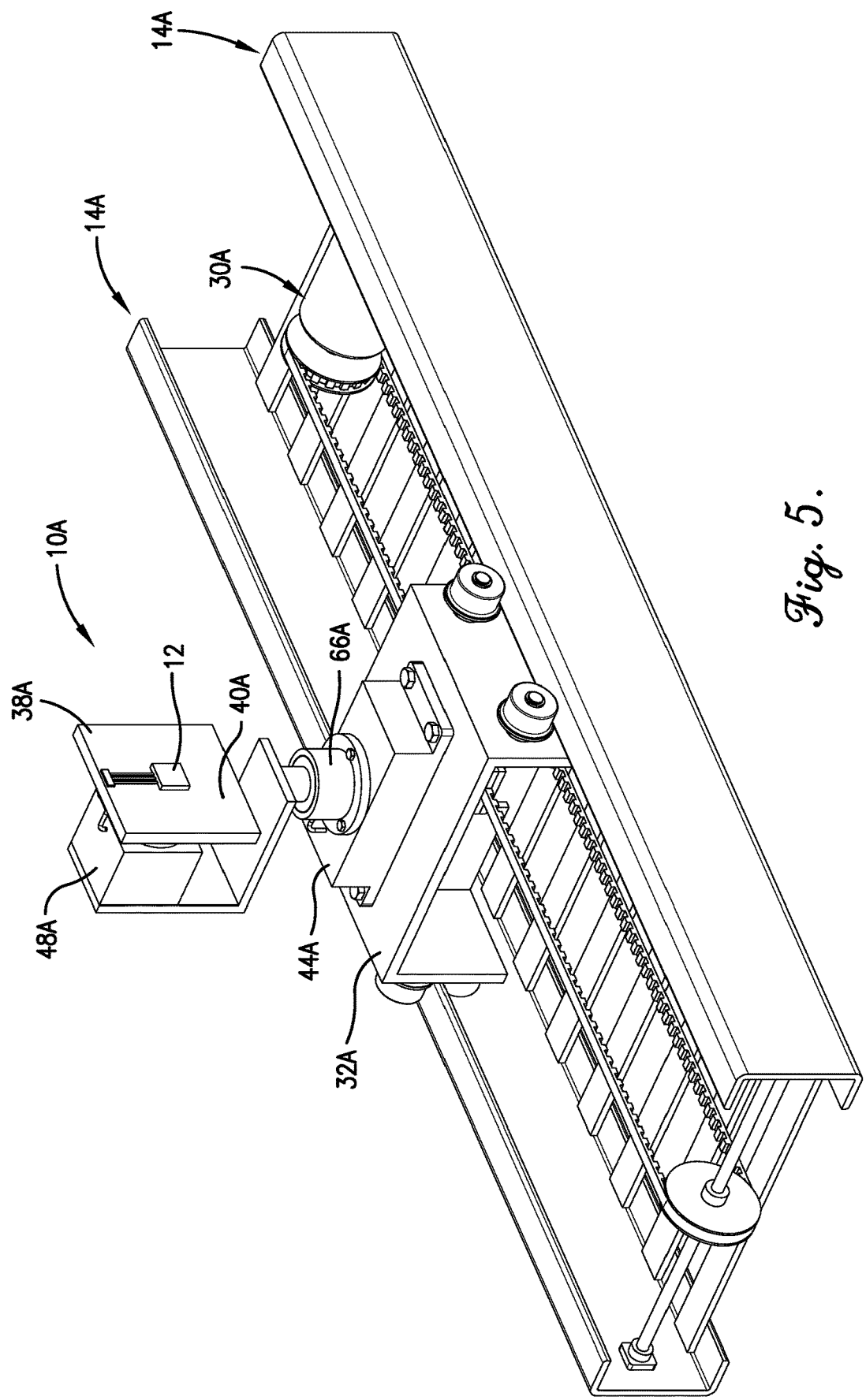
FIG. 5 is an elevated perspective view of an apparatus constructed in accordance with another embodiment of the present invention.
Figure 6:
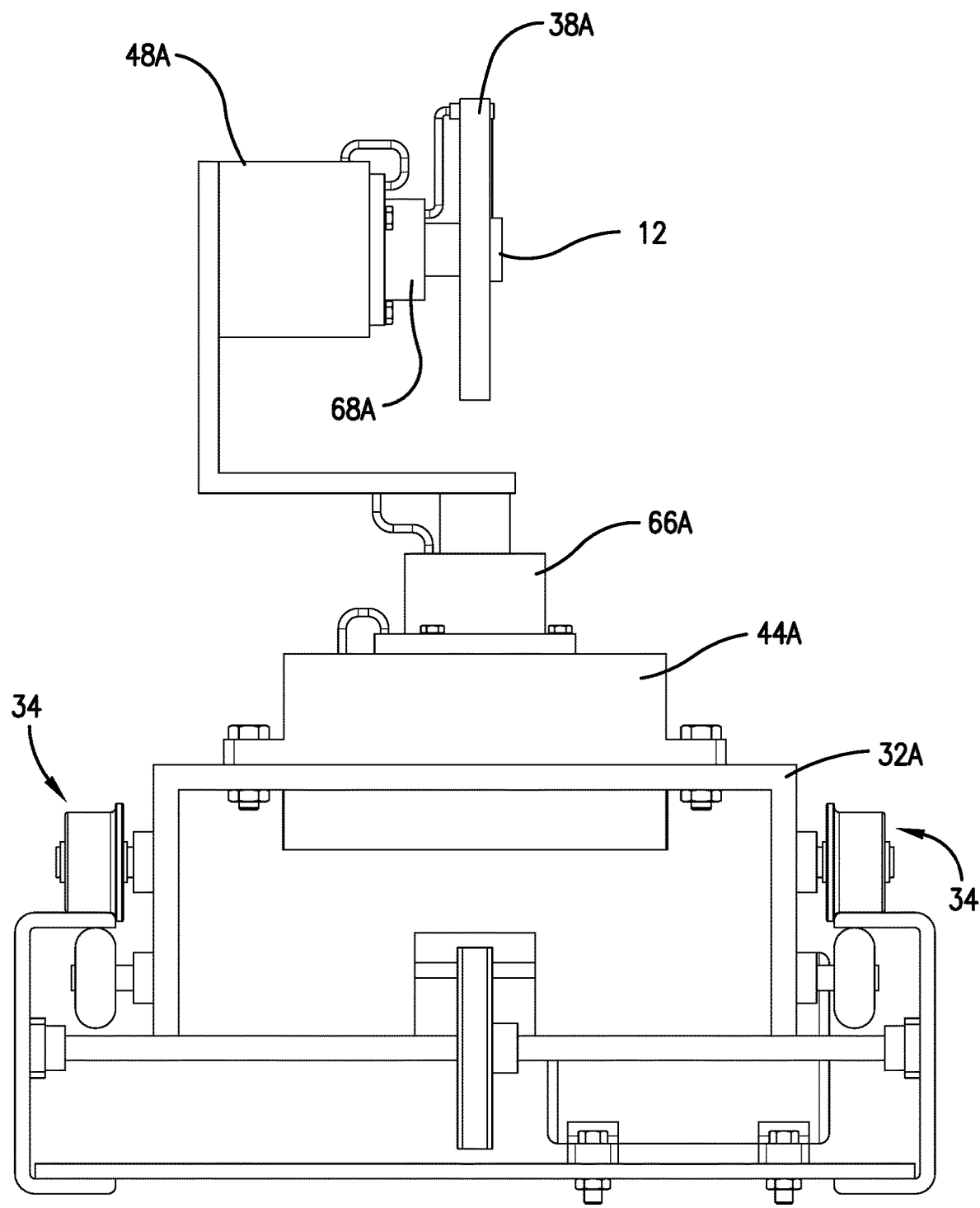
FIG. 6 is a front perspective view of the apparatus of FIG. 5.

An apparatus 10A constructed in accordance with another embodiment of the invention is depicted in FIGS. 5-7. The apparatus 10A may comprise substantially similar components as apparatus 10; thus, the components of apparatus 10A that correspond to similar components of apparatus 10 have an 'A' appended to their reference numerals.

The apparatus 10A includes all the features of apparatus 10 except that the apparatus 10A further comprises slip rings 66A, 68A, which allow for wired communication between the IMU 12, the motors 46A, 48A, 64A, and the control system 22A while also allowing unlimited rotation of the platform 38A about the second axis 36A and about the third axis 42A.

The flow chart of FIG. 8 depicts the steps of an exemplary method 100 of simulating an oscillating flight path. In some alternative implementations, the functions noted in the various blocks may occur out of the order depicted in FIG. 8. For example, two blocks shown in succession in FIG. 8 may in fact be executed substantially concurrently, or the blocks may sometimes be executed in the reverse order depending upon the functionality involved. In addition, some steps may be optional.

The method 100 is described below, for ease of reference, as being executed by exemplary devices and components introduced with the embodiments illustrated in FIGS. 1-7. For example, the steps of the method 100 may be performed by the slide, support structure, table, drive system, control system, etc. through the utilization of processors, transceivers, hardware, software, firmware, or combinations thereof. However, a person having ordinary skill will appreciate that responsibility for all or some of such actions may be distributed differently among such devices or other computing devices without departing from the spirit of the present invention. One or more computer-readable medium(s) may also be provided. The computer-readable medium(s) may include one or more executable programs stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Referring to step 101, a profile associated with a flight path is received. The profile may be received from a database and/or from a user via a user interface. The profile may comprise a plurality of commands and/or settings for the control system to use to direct the motors.

Referring to step 102, a calibrated IMU is connected to the apparatus. The calibrated IMU may be connected to the harness at the center of the surface of the platform. However, the calibrated IMU may be positioned elsewhere on the surface without departing from the scope of the present invention.

Referring to step 103, the calibrated IMU is accelerated along the slide via the apparatus. The motor of the drive system may be directed, via the control system, to cause the belt to pull the chassis along the track of the slide. The calibrated IMU may be accelerated consistent with the acceleration that would occur during the flight path associated with the profile. This step 103 may also include decelerating the calibrated IMU, such as decelerating the calibrated IMU at the end of the slide. This step 103 may also include accelerating the calibrated IMU in the opposite direction.

Referring to step 104, the calibrated IMU may be rotated about the second axis. The calibrated IMU may be rotated by directing the first motor, via the control system, to spin the platform so that its surface rotates around the second axis. The platform may be spun about the second axis so that it rotates about the second axis back and forth 90 degrees from an original orientation. In other words, the platform may be spun +90 degrees from the original orientation, back to the original orientation, and then −90 degrees from the original orientation. The platform may alternatively be spun continuously beyond 360 degrees. This step 104 may be performed simultaneously with the step 103 of accelerating the calibrated IMU along the slide.

Referring to step 105, the calibrated IMU may be rotated about the third axis. The calibrated IMU may be rotated by directing the second motor, via the control system, to rotate the platform so that its surface rotates around the third axis. The platform may be spun about the third axis so that it rotates about the third axis back and forth 90 degrees from an original orientation. In other words, the platform may be spun +90 degrees from the original orientation, back to the original orientation, and then −90 degrees from the original orientation. This step 105 may be performed simultaneously with the step 103 of accelerating the calibrated IMU along the slide and the step 104 of rotating the calibrated IMU about the second axis.

Referring to step 106, signals generated by the calibrated IMU may be received. The signals may be generated in response to movement, rotation, and/or acceleration of the calibrated IMU. The signals may be received by the control system via wired and/or wireless communication. In some embodiments, the signals may be passed via one or more slip rings. This step 106 may include storing the signals from the calibrated IMU in a database.

Referring to step 107, an IMU under test is connected to the apparatus. The IMU under test may be connected to the harness at the center of the surface of the platform, similar to the calibrated IMU. However, the IMU under test may be positioned elsewhere on the surface without departing from the scope of the present invention—it is preferably positioned where the calibrated IMU was placed.

Referring to step 108, the IMU under test is accelerated along the slide via the apparatus. The motor of the drive system may be directed, via the control system, to cause the belt to pull the chassis along the track of the slide. The IMU under test may be accelerated consistent with the acceleration that would occur during the flight path associated with the profile, or the acceleration that the calibrated IMU experienced. This step 108 may also include decelerating the IMU under test, such as decelerating the IMU under test at the end of the slide. This step 108 may also include accelerating the IMU under test in the opposite direction.

Referring to step 109, the IMU under test may be rotated about the second axis. The IMU under test may be rotated by directing the first motor, via the control system, to spin the platform so that its surface rotates around the second axis. The platform may be spun about the second axis so that it rotates about the second axis back and forth 90 degrees from an original orientation. In other words, the platform may be spun +90 degrees from the original orientation, back to the original orientation, and then −90 degrees from the original orientation. The platform may alternatively be spun continuously beyond 360 degrees. The IMU under test may be rotated about the second axis consistent with the flight path and/or the rotation pattern that the calibrated IMU experienced. This step 109 may be performed simultaneously with the step 108 of accelerating the IMU under test along the slide.

Referring to step 110, the IMU under test may be rotated about the third axis. The IMU under test may be rotated by directing the second motor, via the control system, to rotate the platform so that its surface rotates around the third axis. The platform may be spun about the third axis so that it rotates about the third axis back and forth 90 degrees from an original orientation. In other words, the platform may be spun +90 degrees from the original orientation, back to the original orientation, and then −90 degrees from the original orientation. The IMU under test may be rotated about the third axis consistent with the flight path and/or the rotation pattern that the calibrated IMU experienced. This step 110 may be performed simultaneously with the step 108 of accelerating the IMU under test along the slide and the step 109 of rotating the IMU under test about the second axis.

Referring to step 111, signals generated by the IMU under test may be received. The signals may be in response to movement, rotation, and/or acceleration of the IMU under test. The signals may be received by the control system via wired and/or wireless communication. In some embodiments, the signals may be passed via one or more slip rings. This step 111 may include storing the signals from the IMU under test in a database.

Referring to step 112, the signals generated by the IMU under test are compared with the signals generated by the calibrated IMU.

The method 100 may include additional, less, or alternate steps and/or device(s), including those discussed elsewhere herein. For example, calibrated IMU and the IMU under test may be connected to the apparatus at the same time so that they undergo the acceleration and rotation simultaneously.

ADDITIONAL CONSIDERATIONS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the invention has been described with reference to the embodiments illustrated in the attached drawing figures, it is noted that equivalents may be employed and substitutions made herein without departing from the scope of the invention as recited in the claims of any subsequent regular utility application.

Having thus described various embodiments of the invention, what is claimed as new and desired to be protected by Letters Patent includes the following:

The invention claimed is:

1. An apparatus for simulating an oscillating flight path, the apparatus comprising:
   a slide extending along a first axis;
   a support structure movably coupled to the slide so that the support structure is operable to move along the slide; and
   a table coupled to the support structure and operable to rotate about a second axis orthogonal to the first axis, the table comprising a surface parallel to the second axis that is operable to rotate about a third axis orthogonal to the second axis,
   wherein the table is configured to only rotate about 180 degrees about the second axis, and the surface is configured to only rotate about 180 degrees about the third axis.

2. The apparatus of claim 1, wherein the table includes a portion that is orthogonal to the slide, the surface being parallel to the portion of the table.

3. The apparatus of claim 1, wherein the surface comprises a harness for securing an inertial measurement unit.

4. The apparatus of claim 3, further comprising a control system connected to the harness and configured to receive signals from the inertial measurement unit.

5. The apparatus of claim 1, wherein the table is rotatably connected to the support structure so that a portion of the table rotates relative to the support structure.

6. The apparatus of claim 1, wherein the slide comprises a pair of tracks.

7. The apparatus of claim 1, wherein the support structure comprises a chassis movably coupled to the slide, and the table comprises a first motor supported on the chassis and having a drive rod extending along the second axis.

8. The apparatus of claim 7, wherein the table comprises a slip ring coupled to the drive rod of the first motor.

9. The apparatus of claim 7, wherein the table comprises a second motor coupled to the drive rod of the first motor and having a drive rod extending along the third axis and connected to the surface.

10. The apparatus of claim 1, further comprising a drive unit operable to accelerate the support structure along the slide.

11. A method of testing an inertial measurement unit, the method comprising:
   accelerating a support structure along a slide extending along a first axis, the support structure being movably coupled to the slide;
   rotating a surface of a table connected to the support structure about a second axis orthogonal to the first axis, wherein the surface is parallel to the second axis;
   rotating the surface about a third axis orthogonal to the second axis, the inertial measurement unit being attached to the surface; and
   receiving a signal representative of the output of the inertial measurement unit,
   wherein rotating the surface about the second axis and rotating the surface about the third axis occur simultaneously.

12. The method of claim 11, further comprising comparing, via a control system, the signal representative of the output of the inertial measurement to a profile stored in a database.

13. The method of claim 11, wherein the accelerating of the support structure includes directing, via a control system, a linear motor to apply a force to the support structure so that the support structure slides along the slide.

14. The method of claim 11, wherein the step of rotating the surface about the second axis includes directing, via a control system, a motor of the table to spin a drive rod of the motor.

15. The method of claim 11, wherein the step of rotating the surface about the third axis includes directing, via a control system, a motor of the table to spin a drive rod of the motor.

16. The method of claim 11, wherein the step of receiving the signal includes receiving the signal via at least one of wired or wireless transmission.

17. An apparatus for simulating an oscillating flight path, the apparatus comprising:
   a slide extending along a first axis;
   a support structure movably coupled to the slide so that the support structure is operable to move along the slide;
   a drive unit configured to move the support structure along the slide;
   a first motor attached to the support structure and including a drive rod extending along a second axis that is orthogonal to the first axis;
   a bracket attached to the drive rod and including a surface extending parallel to the second axis;
   a second motor attached to the surface of the bracket and including a drive rod extending along a third axis orthogonal to the second axis; and
   a platform attached to the drive rod and having a surface extending orthogonal to the third axis,
   wherein the first motor is configured to only rotate the bracket about 180 degrees about the second axis, and the second motor is configured to only rotate the platform about 180 degrees about the third axis.

* * * * *